United States Patent
Tai et al.

(10) Patent No.: US 7,724,327 B2
(45) Date of Patent: May 25, 2010

(54) TRANSFLECTIVE TFT LCD HAVING STACKED LAYERS INCLUDING A PROTECTIVE LAYER, A TRANSPARENT ELECTRODE AND A RING-SHAPED REFLECTIVE ELECTRODE SURROUNDING AND DEFINING AN OPENING EXPOSING THE UNDERLYING TRANSPARENT ELECTRODE LAYER

(75) Inventors: Yi-Wen Tai, Hsinchu (TW); Cheng-Hsin Chen, Yuanlin Township (TW)

(73) Assignee: TPO Displays Corp., Chu-Nan (TW)

( * ) Notice: Subject to any disclaimer, the term of this patent is extended or adjusted under 35 U.S.C. 154(b) by 491 days.

(21) Appl. No.: 11/375,719

(22) Filed: Mar. 14, 2006

(65) Prior Publication Data

US 2007/0216833 A1    Sep. 20, 2007

(51) Int. Cl.
G02F 1/1335    (2006.01)
(52) U.S. Cl. .................................................. 349/114
(58) Field of Classification Search .................. 349/114
See application file for complete search history.

(56) References Cited

U.S. PATENT DOCUMENTS 6,850,298 B2 * 2/2005 Fujimori et al. ............. 349/114
7,218,363 B2 * 5/2007 Ozawa et al. ............... 349/114
7,304,696 B2 * 12/2007 Yamagishi ................... 349/69
2001/0055082 A1 * 12/2001 Kubo et al. ................. 349/114
2004/0036817 A1 * 2/2004 Paukshto et al. ............. 349/56
2006/0139523 A1 * 6/2006 Wang ......................... 349/114

FOREIGN PATENT DOCUMENTS

CN    2582024    10/2003
CN    1721942    1/2006

* cited by examiner

*Primary Examiner*—John Heyman
(74) *Attorney, Agent, or Firm*—Liu & Liu

(57) ABSTRACT

A system for displaying images. The system comprises a transflective liquid crystal display (LCD) panel comprising lower and upper substrates opposing each other and a liquid crystal layer disposed therebetween. The lower substrate comprises reflective and transmissive regions. A stack of a protective layer, a transparent electrode and a reflective electrode is disposed on the lower substrate of the reflective and transmissive regions. The reflective electrode comprises an opening corresponding to the transmissive region to substantially expose the underlying transparent electrode. A transparent dielectric layer is disposed on the surface of the upper substrate facing and corresponding to the lower substrate of the reflective region.

20 Claims, 5 Drawing Sheets

TRANSFLECTIVE TFT LCD HAVING STACKED LAYERS INCLUDING A PROTECTIVE LAYER, A TRANSPARENT ELECTRODE AND A RING-SHAPED REFLECTIVE ELECTRODE SURROUNDING AND DEFINING AN OPENING EXPOSING THE UNDERLYING TRANSPARENT ELECTRODE LAYER

BACKGROUND OF THE INVENTION

1. Field of the Invention

The invention relates to liquid crystal display (LCD) technology, and in particular to a pixel structure for a transflective LCD device to improve pixel reliability, and a method for fabricating an LCD device with the improved pixel structure.

2. Description of the Related Art

Liquid crystal display (LCD) devices are widely used in electronic devices such as portable computers, PDAs and cell phones. Typically, LCD devices are classified into transmissive and reflective types. The former utilizes a backlight as the light source and the latter utilizes ambient light. The transmissive LCD device exhibits a high contrast ratio and good color saturation. However, it is difficult to decrease power consumption due to power requirements of the backlight. Reflective LCD devices have the advantage of power-saving under bright ambient light. However, their contrast ratio is lower and color saturation inferior to transmission types. Moreover, the reflective LCD device is limited showing images under dark ambient conditions.

In order to improve the drawbacks of these two types of LCD device, a transflective LCD device has been developed, displaying in transmissive and reflective modes. FIG. 1 illustrates a conventional transflective LCD device. The device includes a lower substrate 100 (referred to as an array substrate), an upper substrate 114 and a liquid crystal layer 108 disposed therebetween. The lower substrate 100 comprises a pixel region (consisting of a reflective region R and a transmissive region T) defined by a pair of scan lines (not shown) and a pair of data lines (not shown). A thin film transistor (not shown) is disposed on the lower substrate 100 of the reflective region R and electrically connected to the scan line and the data line. A protective layer 102 and a pixel electrode are successively disposed on the lower substrate 100. The pixel electrode includes a transparent electrode 104 and an overlying reflective electrode 106. The reflective electrode 106 is disposed in the reflective region R to partially overlap the transparent electrode 104. A color filter (CF) 112 and a transparent dielectric layer 110 are successively disposed on the upper substrate 114. The transparent dielectric layer 110 formed on the color filter 112 (also referred to as step on CF (SOC) structure) corresponds to the reflective region R to form a transflective LCD device with dual cell gap.

In the transflective LCD device with dual cell gap, however, peeling of the transparent electrode 104 near the edge of the transmissive region T may occur during defining the overlying reflective layer for formation of reflective electrode 106, as shown in FIG. 2, reducing the pixel reliability. The transparent electrode 104 has worse adhesion strength at the edges of the pixel region due to the step height produced by the underlying scan line and data line, resulting in stress concentration. In particular, after lithography on the reflective layer for formation of the reflective electrode, the photoresist, the reflective layer and the transparent electrode in the transmissive region may peel off the protective layer.

Thus, there exists a need in the art for development of an improved pixel structure which can prevent the transparent electrode from peeling to improve pixel reliability.

BRIEF SUMMARY OF THE INVENTION

A detailed description is given in the following embodiments with reference to the accompanying drawings. Systems for displaying images are provided. An embodiment of a system comprises a transflective thin film transistor liquid crystal display panel comprising lower and upper substrates opposing each other and a liquid crystal layer disposed therebetween. The lower substrate comprises reflective and transmissive regions. A stack of a protective layer, a transparent electrode and a reflective electrode is disposed on the lower substrate of the reflective and transmissive regions. The reflective electrode comprises an opening corresponding to the transmissive region to substantially expose the underlying transparent electrode. A transparent dielectric layer is disposed on the surface of the upper substrate facing and corresponding to the lower substrate of the reflective region.

An embodiment of a method for fabricating a system for displaying images comprises providing a lower substrate comprising reflective and transmissive regions. A protective layer, a transparent electrode and a reflective electrode are successively formed on the lower substrate of the reflective and transmissive regions, wherein the reflective electrode comprises an opening corresponding to the transmissive region to substantially expose the underlying transparent electrode. An upper substrate opposite the lower substrate is provided. A transparent dielectric layer is formed on the surface of the upper substrate facing and corresponding to the lower substrate of the reflective region. A liquid crystal layer is formed between the lower and upper substrates.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
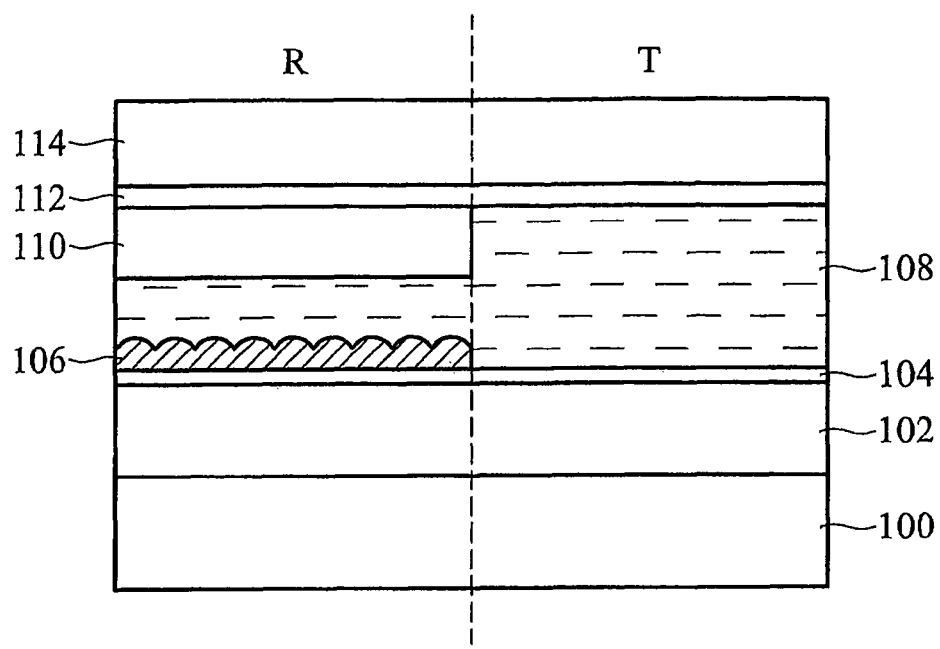
FIG. 1 is a cross section of a conventional transflective LCD device with dual cell gap.
Figure 2:
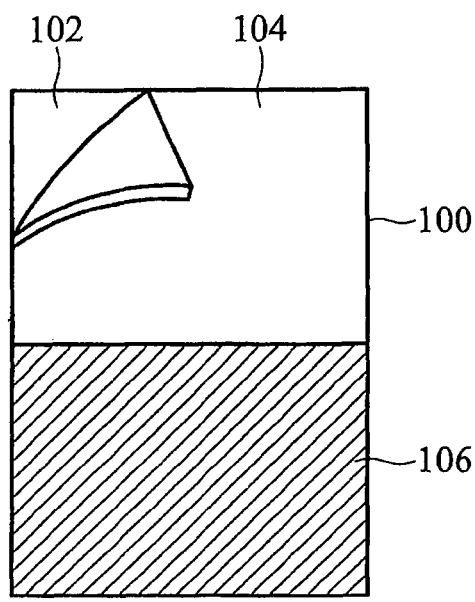
FIG. 2 is a plane view of pixel structure of the transflective LCD device shown in FIG. 1.

The following description is of the best-contemplated mode of carrying out the invention. This description is made for the purpose of illustrating the general principles of the invention and should not be taken in a limiting sense. The scope of the invention is best determined by reference to the appended claims.

Exemplary embodiments of systems for displaying images and fabrication methods will now be described. In this regard, FIG. 3D depict an embodiment of such a system. Specifically, the system incorporates a transflective thin film transistor liquid crystal display panel 300 that includes a lower substrate 200 (referred to as an array substrate), an upper substrate 214 and a liquid crystal layer 208 disposed therebetween. The lower and upper substrates 200 and 214 are transparent, such as glass, quartz or other material. Typically, the lower substrate 200 comprises a plurality of pixel regions defined by scan lines and data lines. Here, in order to simplify the diagram, only a pixel region defined by a pair of scan lines (not shown) and a pair of data lines (not shown) is depicted. Generally, the pixel region consists of a reflective region R and a transmissive region T. A thin film transistor (not shown) is disposed on the lower substrate 200 of the reflective region R and electrically connected to the scan line and the data line.

A stack of a protective layer 202 and a pixel electrode is disposed on the lower substrate 200. The pixel electrode comprises a transparent electrode 204 and an overlying reflective electrode 206a. In this embodiment, the reflective electrode 206a partially overlaps the underlying transparent electrode 204. That is, the reflective electrode 206a comprises an opening 211 corresponding to the transmissive region T to substantially expose the underlying transparent electrode 204. Particularly, the opening 211 is completely surrounded by the reflective electrode 206a. In some embodiments, the opening 211 may be partially surrounded by the reflective electrode 206a. For example, the reflective electrode 206a in the reflective region R extends along the edges of the transmissive region T beneath which the data lines or scan lines are disposed.

A color filter (CF) 212 and a transparent dielectric layer 210 are successively disposed on the surface of the upper substrate 214 facing to the lower substrate 200. In this embodiment, the transparent dielectric layer 210 disposed on the color filter 212 (also referred to as step on CF (SOC) structure) corresponds to the reflective region R to form a system for displaying images incorporating a transflective liquid crystal display panel with dual cell gap.

Figure 3A:
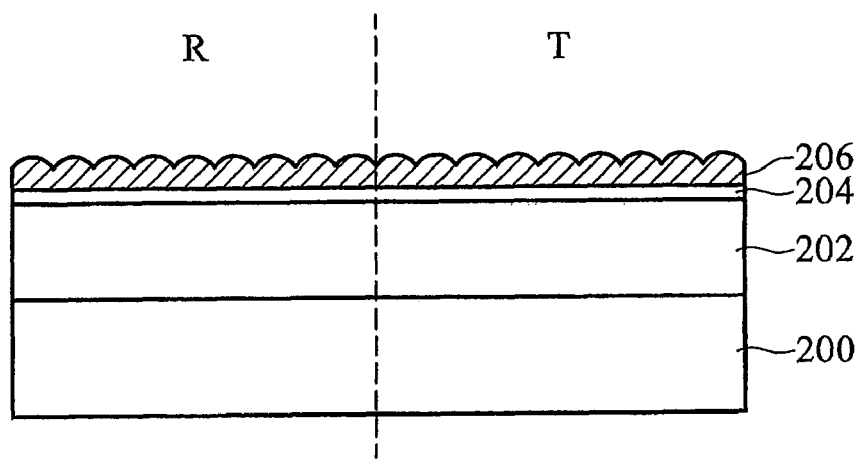
FIGS. 3A to 3D are cross-sections of an embodiment of a method for fabricating a system for displaying images incorporating a transflective thin film transistor liquid crystal display panel.
Figure 3B:
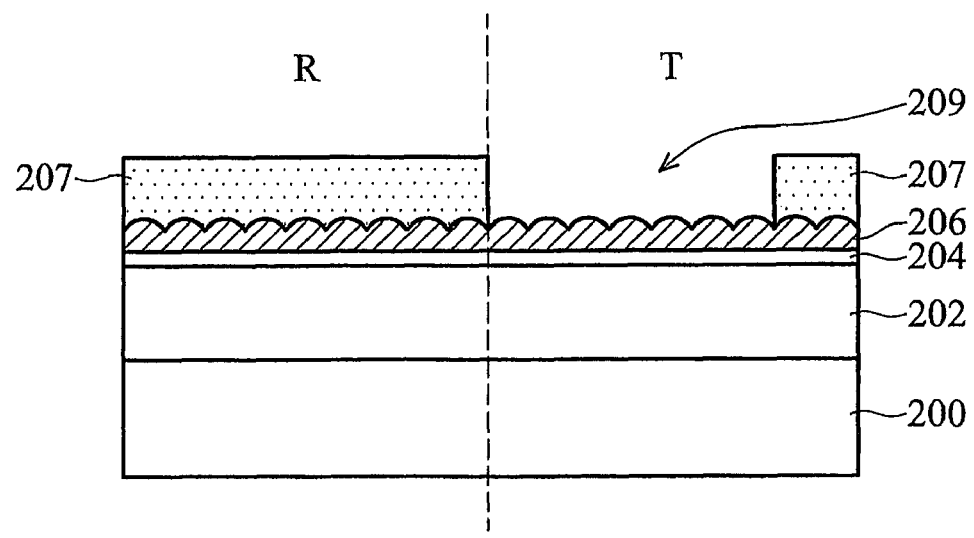
Figure 3C:
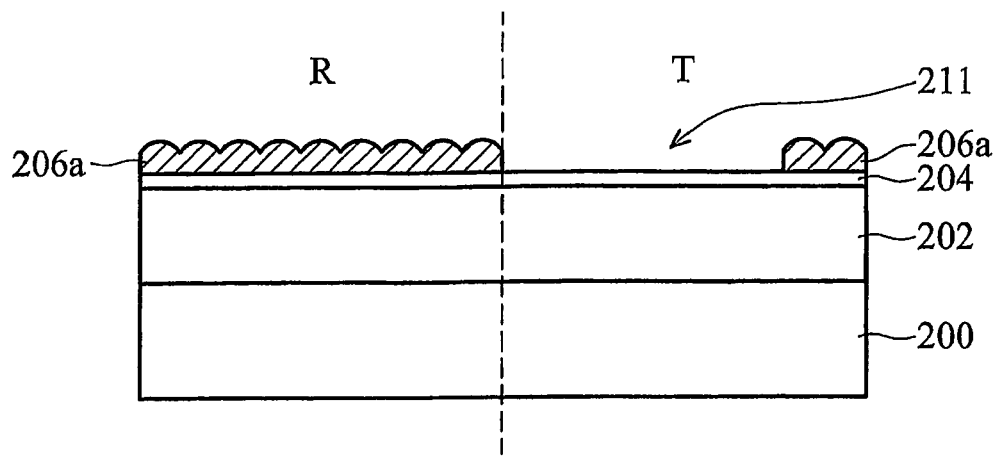
Figure 3D:
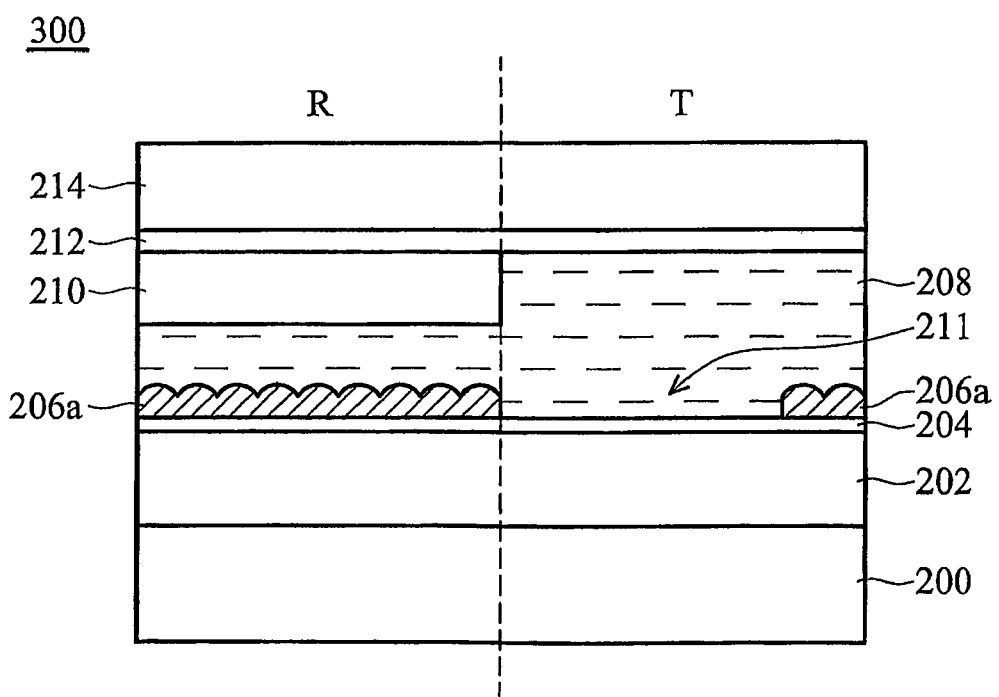

FIGS. 3A to 3D illustrate a method for fabricating a system for displaying images incorporating a transflective thin film transistor liquid crystal display panel. In FIG. 3A, a lower substrate 200, such as transparent glass or quartz, is provided. The lower substrate 200 may contain data lines, scan lines and thin film transistors (TFTs). Each TFT is electrically connected to a scan line and a data line and is located in a pixel region defined by a pair of scan lines and a pair of data lines. Here, in order to simplify the diagram, a flat substrate comprises a pixel region consisting of a reflective region R and a transmissive region T is depicted. A protective layer 202 is formed on the lower substrate 200. The protective layer 202 may comprise a single layer, such as a silicon oxide or silicon nitride layer, or multiple layers, such as a silicon oxide layer and a silicon nitride layer. Next, a transparent layer 204 is deposited on the protective layer 202 in the reflective and transmissive regions R and T, serving as a transparent electrode for the transmissive region T. In this embodiment, the transparent electrode 204 may comprise indium tin oxide (ITO) or indium zinc oxide (IZO) formed by conventional deposition. For example, the transparent electrode 204 can be formed by sputtering. An opaque conducting layer 206 with bumps is subsequently deposited on the transparent electrode 204. The opaque conducting layer 206 may comprise Al, Ag, Mo, AlNd, or a combination thereof. Moreover, the opaque conducting layer 206 can be formed by conventional deposition, such as sputtering. The transparent electrode 204 and the opaque conducting layer 206 are electrically connected for formation of a pixel electrode in subsequent steps. Moreover, the pixel electrode is electrically connected to the TFT.

In FIG. 3B, lithography is performed on the opaque conducting layer 206 for formation of a reflective electrode in the reflective region R. For example, a resist pattern layer 207 with an opening 209 is formed on the opaque conducting layer 206 by exposing and developing a resist layer coated thereon. In this embodiment, the opening 209 corresponds to the transmissive region T to substantially expose the underlying opaque conducting layer 206. Particularly, the opening 209 is completely surrounded by the resist pattern layer 207. In some embodiments, the opening 209 may be partially surrounded by the resist pattern layer 207. For example, the resist pattern layer 207 in the reflective region R extends along the edges of the transmissive region T beneath which the data lines or scan lines are disposed.

Figure 4:
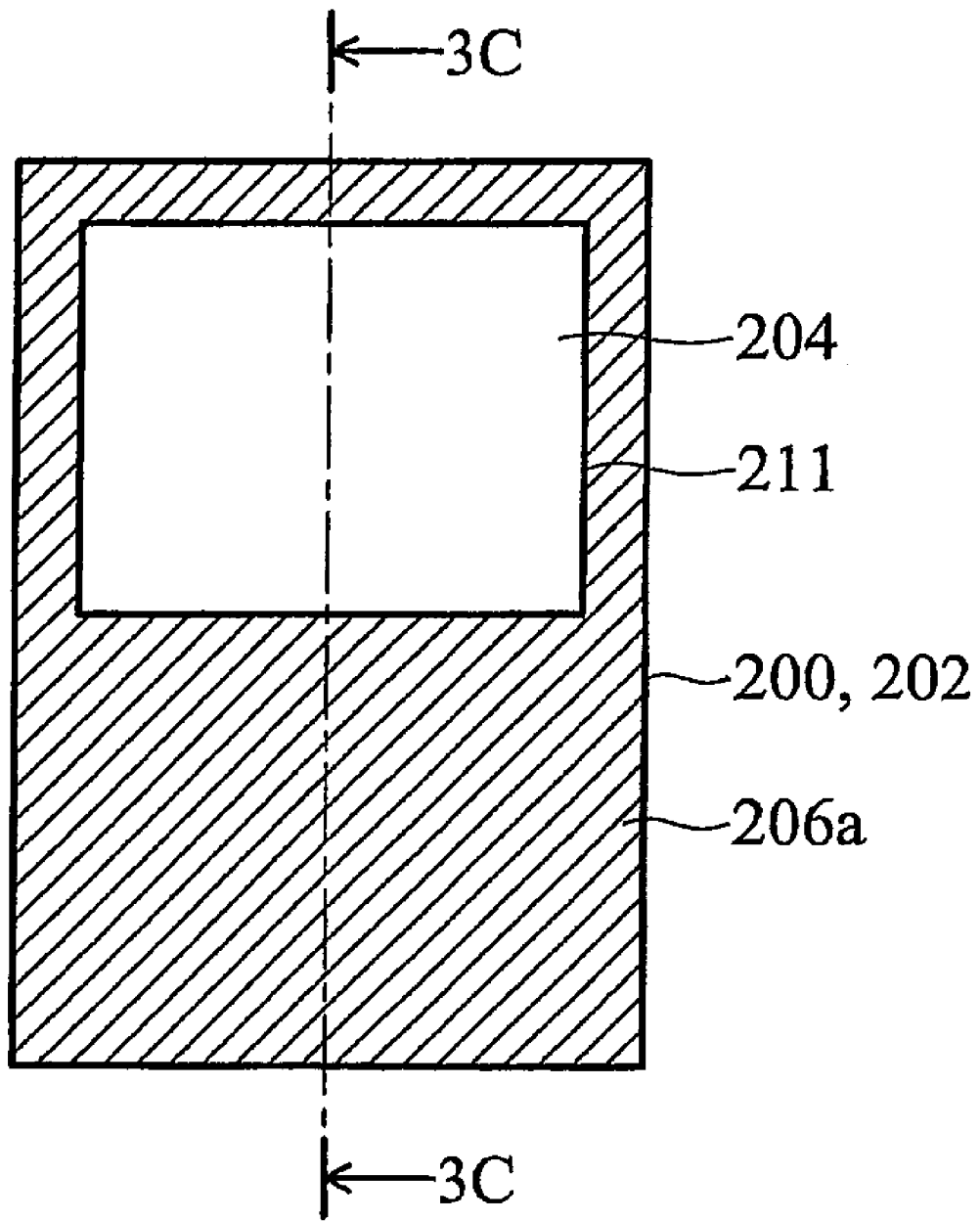
FIG. 4 is a plane view of pixel structure shown in FIG. 3C.

In FIG. 3C, the opaque conducting layer 206 under the opening 209 is removed by etching, to form a reflective electrode 206a. After removing the unnecessary resist pattern layer 207, the pixel structure of the invention is complete. FIG. 4 illustrates a plane view of pixel structure shown in FIG. 3C, a pixel electrode comprises the transparent electrode 204 and the overlying reflective electrode 206a. The reflective electrode 206a partially overlaps the underlying transparent electrode 204. For example, the reflective electrode 206a comprises an opening 211 corresponding to the transmissive region T to substantially expose the underlying transparent electrode 204. Particularly, the opening 211 is completely surrounded by the reflective electrode 206a. In some embodiments, the opening 211 may be partially surrounded by the reflective electrode 206a. For example, the reflective electrode 206a in the reflective region R extends along the edges of the transmissive region T beneath which the data lines or scan lines are disposed.

In FIG. 3D, an upper substrate 214, such as a transparent glass or quartz, is provided. A color filter 212 is formed on the upper substrate 214. Next, a transparent dielectric layer 210 is formed on the color filter 212, such that the transparent dielectric layer 210 faces and corresponds to the lower substrate 200 of the reflective region R. In this embodiment, the transparent dielectric layer 210 may comprise silicon oxide, silicon nitride or a combination thereof and be formed by conventional deposition, lithography and etching. Finally, the upper substrate 214 having the color filter 212 and the transparent dielectric layer 210 thereon and the lower substrate 200 having a pixel structure thereon are sealed, such that the upper substrate 214 is opposite to the lower substrate 200. A liquid crystal material is injected into the space between the upper and lower substrates 214 and 200 to form a liquid crystal layer 208 therebetween.

In this embodiment, the reflective electrode 206a with ring-shape covering the transparent electrode 204 at the edges of the transmissive region T protects peeling of the transparent electrode 204 near the edge of the transmissive region T due to definition of the reflective electrode 206. The reflective electrode 206a with ring-shape not only mitigates the stress concentration at the edges of transmissive region T, but also isolates the chemical reaction between the development solution and the transparent electrode 204 near the edge of the transmissive region T. Accordingly, peeling of the transparent electrode 204 can be prevented to improve pixel reliability.

Figure 5:
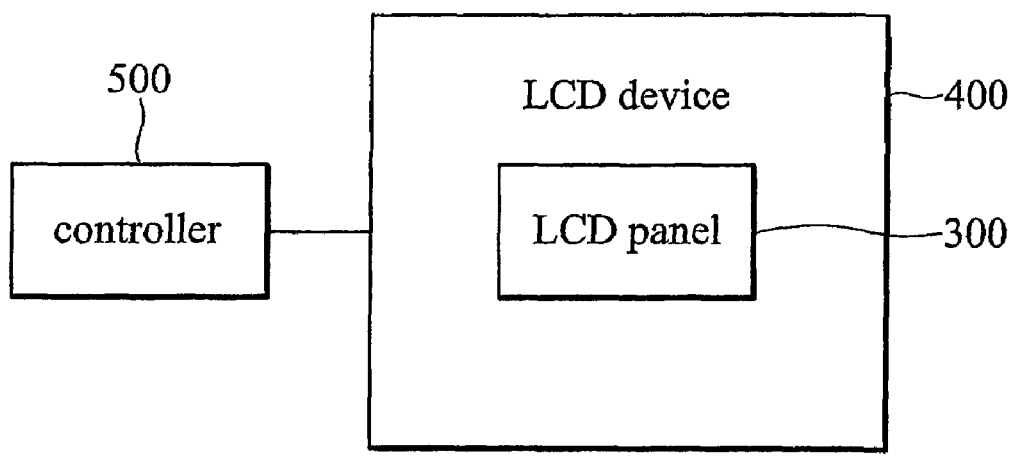
FIG. 5 schematically shows another embodiment of a system for displaying images.

FIG. 5 schematically shows another embodiment of a system for displaying images which, in this case, is implemented as a transflective thin film transistor liquid crystal display device 400 or an electronic device 600 such as a laptop computer, a mobile phone, a digital camera, a personal digital assistant (PDA), a desktop computer, a television, a car display or a portable DVD player. In some embodiments, the described transflective thin film transistor liquid crystal display panel can be incorporated into a display device that can be a transflective thin film transistor liquid crystal display device. As shown in FIG. 5, the transflective thin film transistor liquid crystal display device 400 may comprise a transflective thin film transistor liquid crystal display panel 300 shown in FIG. 3D. In some embodiments, the display device 400 can be incorporated into the electronic device 600. As shown in FIG. 5, the electronic device 600 may comprise the display device 400 comprising the display panel 300 and a controller 500 coupled to the display panel 300, in which the controller 500 is operative to control the display panel 300 to render images in accordance with input.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A transflective thin film transistor liquid crystal display panel, comprising:
    a lower substrate comprising reflective and transmissive regions;
    a stack of a protective layer, a transparent electrode layer and a ring-shaped reflective electrode layer disposed on the lower substrate of the reflective region and on part of the transmissive region, wherein the reflective electrode layer defines an opening within the transmissive region to substantially expose the underlying transparent electrode layer, and wherein at least the portion of the reflective electrode layer surrounding the opening is attached directly to the transparent electrode layer to form the opening for the transmissive region;
    an upper substrate opposite the lower substrate;
    a transparent dielectric layer disposed on the surface of the upper substrate facing and corresponding to the lower substrate of the reflective region; and
    a liquid crystal layer disposed between the lower and upper substrates.

2. The display panel as claimed in claim 1, wherein the opening is completely surrounded by the reflective electrode layer.

3. The display panel as claimed in claim 1, wherein the opening is partially surrounded by the reflective electrode layer.

4. The display panel as claimed in claim 1, wherein the lower and upper substrates are transparent.

5. The display panel as claimed in claim 1, wherein the protective layer comprises silicon oxide, silicon nitride or a combination thereof.

6. The display panel as claimed in claim 1, wherein the transparent electrode layer comprises ITO or IZO.

7. The display panel as claimed in claim 1, wherein the reflective electrode layer comprises Al, Ag, Mo, AlNd or a combination thereof.

8. The display panel as claimed in claim 1, wherein the transparent dielectric layer comprises silicon oxide, silicon nitride or a combination thereof.

9. The display panel as claimed in claim 1, further comprising a color filter disposed between the upper substrate and the transparent dielectric layer.

10. A liquid crystal display device comprising the transflective thin film transistor liquid crystal display panel as claimed in claim 1; and
    a controller coupled to the transflective thin film transistor liquid crystal display panel, being operative to control the panel to render images in accordance with an input.

11. An electronic device comprising the liquid crystal display device as claimed in claim 10.

12. The electronic device as claimed in claim 11, wherein the electronic device is a laptop computer, a mobile phone, a digital camera, a personal digital assistant (PDA), a desktop computer, a television, a car display or a portable DVD player.

13. The liquid crystal display device comprising the transflective thin film transistor liquid crystal display panel as claimed in claim 1; and
    means for controlling the panel to render images.

14. The display panel as claimed in claim 1, wherein the stack comprises the protective layer, the transparent electrode layer and the reflective electrode layer are arranged in that order.

15. The display panel as claimed in claim 1, wherein at a location corresponding to the reflective region, the reflective electrode layer is over the transparent electrode layer within the stack, and at a location corresponding to the transmissive region, the opening in the reflective electrode layer is above the transparent electrode layer.

16. The display panel as claimed in claim 1, wherein the reflective electrode layer and the transparent electrode layer are not coplanar layers within the stack.

17. A transflective liquid crystal display panel, comprising:
    a lower substrate;
    a protective layer over the lower substrate;
    a transparent electrode layer over on the protective layer;
    a reflective electrode layer over the transparent electrode layer, wherein the ring-shaped reflective electrode layer defining an opening within a transmissive region to substantially expose the underlying transparent electrode layer, and wherein at least the portion of the reflective electrode layer extending over part of the transmissive region and surrounding the opening is attached directly to the transparent electrode layer to form the opening for the transmissive region;
    an upper substrate opposite the lower substrate;
    a transparent dielectric layer on the upper substrate facing the lower substrate, corresponding to a reflective region; and
    a liquid crystal layer disposed between the lower and upper substrates.

18. The display panel as claimed in claim 17, wherein the protective layer, the transparent electrode layer and the reflective electrode layer are arranged in that order in a stack over the lower substrate.

19. The display panel as claimed in claim 17, wherein at a location corresponding to the reflective region, the reflective electrode layer is over the transparent electrode layer within the stack, and at a location corresponding to the transmissive region, the opening in the reflective electrode layer is above the transparent electrode layer.

20. The display panel as claimed in claim 18, wherein the reflective electrode layer and the transparent electrode layer are not coplanar layers within the stack.

* * * * *